United States Patent [19]
Hodes et al.

[11] Patent Number: 5,226,953
[45] Date of Patent: Jul. 13, 1993

[54] PROCESS AND DEVICE FOR PRODUCING A LAMINATED MATERIAL FOR SLIDE ELEMENTS

[75] Inventors: Erich Hodes, Rossbach; Robert Mergen, Wiesbaden, both of Fed. Rep. of Germany

[73] Assignee: Glyco Metallwerke Daelen & Loos GmbH, Wiesbaden, Fed. Rep. of Germany

[21] Appl. No.: 720,860

[22] PCT Filed: May 17, 1990

[86] PCT No.: PCT/DE90/00365
§ 371 Date: Jul. 16, 1991
§ 102(e) Date: Jul. 16, 1991

[87] PCT Pub. No.: WO91/07518
PCT Pub. Date: May 30, 1991

[30] Foreign Application Priority Data
Nov. 17, 1989 [DE] Fed. Rep. of Germany ....... 3938234

[51] Int. Cl.$^5$ .............................................. B22D 19/14
[52] U.S. Cl. ........................................ 75/693; 164/95; 428/548
[58] Field of Search .......................... 75/693; 428/548; 164/95; 420/590

[56] References Cited
U.S. PATENT DOCUMENTS
4,147,533  4/1979  Flinn .................................. 420/590

Primary Examiner—Peter D. Rosenberg
Attorney, Agent, or Firm—Herbert Dubno; Yuri Kateshov

[57] ABSTRACT

A process for producing a laminated material for slide elements including at least one backing layer and at least one functional layer of a material frozen in the amorphous state and the backing layer.

34 Claims, 7 Drawing Sheets

PROCESS AND DEVICE FOR PRODUCING A LAMINATED MATERIAL FOR SLIDE ELEMENTS

CROSS REFERENCE TO RELATED APPLICATIONS

This application is a national phase of PCT/DE 90/00365 filed May 17, 1990 and based upon German National Application P3938234.6 filed Nov. 17, 1989.

FIELD OF THE INVENTION

The invention relates to a process for the manufacture of a laminated material for slide elements with a sliding layer consisting of at least one alloy in the form of a metallurgical two-component or multi-component system with a miscibility gap (monotectic) which is applied to a substrate. The invention also relates to a device for carrying out the process.

BACKGROUND OF THE INVENTION

Alloys in the form of metallurgical two-component or multi-component systems with a miscibility gap (monotectic), also called dispersion alloys, generally consist of metallic components of very different specific weight. The heavy components, such as Pb in AlPb dispersion alloys have a strong tendency to segregate, for instance during the solidification of the alloy. Initially more mixed crystals of a different concentration are separated than during the later stage of cooling, so that the mixed crystals from the melt are not homogeneous. The manufacture of AlPb materials for use in slide bearings under terrestrial conditions using casting techniques is therefore made impossible for instance by the miscibility gap existing in the AlPb system. The fine distribution of lead in an Al-matrix required for use in a slide bearing material is not reached.

In connection with the production of functional layers of such dispersion alloys, DE-OS 31 37 745 for instance discloses, the manufacture of metal powders by atomization of a melt and its sintering onto a substrate. However, this method provides a very nonhomogeneous structure, so that the results fluctuate considerably when tested in a machine for slide-bearing testing. In addition, it had been found that as a result of the inner notch effect, the pores which are still present in the sintered layer cause cracking when the slide element is subjected to alternating loads From DE-AS 15 08 856 a method is already known which requires the use of continuous casting for aluminum alloys with a high content of lead. Thereby, a homogeneous one-phase melt of an aluminum-lead alloy containing 20 to 50% lead is cast onto a metallic substrate to directly produce a composite bearing material. However, this method leads to a defective bond of the AlPb sliding layer (functional layer) with the steel. Moreover, in spite of cooling with water, separation takes place even in the mold, which means that the temperature gradient between the temperature of the homogeneous melt and the mold temperature is too small, so that the onset of the thermodynamic equilibrium can not prevented. The result is a sliding layer with a homogeneous, segregated structure; a two-layered tribologically non-usable sandwich results, which in addition has the disadvantage of poor bonding with the substrate.

Also, from DE-PS 21 30 421 and DE-OS 22 41 628 methods for the production of composite metal strips are known, wherein molten aluminum exits through an opening in the bottom of a melting crucible and molten lead is guided in a thin, thread-like stream through the molten aluminum also in the opening in the bottom of the melting crucible. The melt mixture of for instance aluminum and lead formed in the bottom opening of the melting crucible is then vibrated and mixed by ga jets and blown onto the upper surface of a substrate travelling alongside. A functional layer produced this way is still nonhomogeneous to a large extent, whereby due to their much greater density the lead particles have a strong tendency to segregate and coagulate as the agitated stream of melt mixture is applied onto the surface of the substrate.

A method is known from DE-AS 22 63 268 wherein a melt mixture of lead and aluminum is laterally centrifuged in the form of fine particles by a rotor designed as a siphon and segregated on an impact wall where the material solidifies in the form of flakes (splatter cooling). However, due to its flake-shaped (leaf-shaped) structure, this material cannot be processed to a plating material, by extrusion or by powder rolling. During the production of molded parts using pressure and temperature (by means of isostatic presses), segregation occurs again, resulting in extensive nonhomogenity and consequently in unusability of AlPb solid bearings manufactured by this method.

In DE-OS 17 75 322 a slide bearing or a material for its manufacture is described, which consists of Al-alloys (e.g. dispersion alloys based on AlPb or AlSn), wherein the Al material which is later plated on steel serving as a substrate is manufactured by powder rolling. As a result of the compaction by powder rolling and of the subsequent rolling and plating operation, the Al bearing material made this way has a banded arrangement of the soft minority phase (e.g. Pb). Such a banded structure is a considerable disadvantage for slide bearings subjected to alternating loads, since permanent cracks are formed in the bands as a result of the inner notch effect.

PCT WO 87/04377 describes a process by means of which an AlPb strip with a thickness of 1 to 5 mm is produced and then plated onto steel serving as a substrate material. However, the fine lead distribution described therein is not achieved in practice, because due to the rolling-plating operation, the lead is distributed in bands and does not resume the globular form even during the subsequent heat treatment Besides, it has been found that segregation takes place already in strips which are thicker than 0.5 mm.

This drawback is avoided by DE-PS 37 30 862.9–16 which, while using a melt-spin process similar to the one described in WO 87/04377, has an AlPb foil having a maximum thickness of 0.5 mm and a very fine globular distribution of lead which is applied on a substrate by ultrasonic welding, by soldering or gluing thereby avoiding rolling operations.

However, it has been proven that the ultrasonic welding is an expensive and not particularly reliable procedure, while soldering and gluing are not suitable for the production by the strip method of semifinished materials to be used in slide bearings.

OBJECTS OF THE INVENTION

It is an object of the invention to provide a process for producing a laminated material for slide elements, having a sliding layer which applied onto a support layer and consisting of at least one alloy in the form of a metallurgical two-component or multi-component system with a miscibility gap (monotectic), while a globular fine distribution of the dispersed metal components (the minority phase) in a quasi-amorphous metallic matrix has to be achieved in the sliding layer.

Still another object is to provide an apparatus for carrying out the process according to the invention.

SUMMARY OF THE INVENTION

Such a laminated material is obtained by a process wherein the sliding layer is continuously cast from the alloy and is subjected immediately after casting to a continuous run through a cooling device with a sufficiently high solidification rate to prevent the growth of particles of the immiscible metallurgical components to a particle size between 0.01 and 1 μm, preferably less than 1 μm. Due to the high cooling rate, a uniform globular distribution of the dispersed metal component (minority phase) is frozen in the matrix of the melt. The segregation which occurs in alloys of this kind is reduced to a minimum.

Thus, a laminated material is produced whose sliding layer (functional layer) has considerably improved characteristics due to the quasi-amorphous state of the matrix material and to the substantially uniformly globular distribution of the minority phase. The strength of the functional layer is thus considerably increased. In spite of the extremely high strength, the ductility and tenacity of the functional layer are also improved.

Preferably, the alloy or alloys are produced through fusion metallurgy and during their production as well as during their period of readiness for casting are kept at temperatures above the segregation temperature corresponding to the system o composition.

An especially preferred possibility to achieve within the framework of the invention a fine globular and most possibly uniform distribution of the minority phase in the matrix, consists in the addition of nucleants, corresponding to the relevant alloy type, P, B, Ti, Si, borides, nitrides and/oxides, to the alloy or alloys to be cast in an amount between 0.1 and 3.5% by weight. In this way it is possible to cause the very quick formation of a large number of the finest particles of the minority phase which prevent each other from growing so that even with the high cooling rate achievable in practice a very fine globular distribution is obtained in the matrix which solidifies during cooling. In the process according to the invention, systems with a lead minority phase can be considered, for instance AlPb, FePb, CuPb, MnPb, NiPb and possibly also CrPb and CoPb. Besides, also similar systems with tin, bismuth or antimony as a minority phase, such as AlSn, AlBi, AlSb, CrSn can be formed. Also PbZn may be used. The invention offers two basic possibilities:

(a) The dispersion alloy is cast in the form of a thin layer or a film onto a substrate forming the carrier layer, preferably cast continuously onto a strip-shaped substrate. The above-mentioned steps according to the invention are taken during the casting and the subsequent quick cooling in order to achieve a fine globular distribution of the minority phase in the metal matrix. The sliding layer can be cast in one or more stages. In the multi-stage casting, initially a first thin film is cast and then immediately quickly and efficiently cooled. After the solidification of the first film, a second film is cast thereon and is also brought to quick solidification. Such a sliding layer can be built up in several stages. The individually cast films can be of different thickness. Also the composition of the alloys of the films can be different. By using different alloys and/or different cooling conditions, it is possible to form within the sliding layer thin layers having different structures.

(b) Another possibility for the forming of a sliding layer consist in first casting the sliding layer in the form of a strip or foil independently of the substrate and then, after cooling, to apply it continuously to the substrate by a method of joining, e.g. with the aid of a laser beam.

With the process according to the invention it is possible to produce directly slide bearings composed of three materials. This can be achieved with the two basic working possibilities by casting the sliding layer directly onto a travelling strip. If the sliding layer is intended to be cast independently of the substrate and then attached thereto, a precoated strip can also be used in this case as a substrate material for the sliding-layer foil.

Within the framework of the process according to the invention such strips can have a steel backing and an intermediate layer consisting of the following alloys:

copper-lead alloys, e.g. Pb 9 to 25%, Sn 1–11%, Fe, Ni, Mn less than/equal to 0.7%, the balance being Cu;

copper-aluminum alloys, e.g. Al 5 to 8%, the balance Cu;

aluminum-tin alloys, e.g. Cu 0.5 to 1.5%, Sn 5 to 23%, Ni 0.5 to 1.5%, the balance being Al;

aluminum-nickel alloys, e.g. Ni 1 to 5%, Mn 0.5 to 2%, Cu smaller than/equal to 1%, the balance being Al;

aluminum-zinc alloys, e.g. Zn 4 to 6%, Si 0.5 to 3%, Cu up to 2%, Mg up to 1%, the balance being Al.

It has been found that a laminated material of steel/intermediate layer with a functional layer cast thereon or attached by another joining method can be safely and continuously produced this way, preferably with the desired thickness of the functional layer.

In order to increase the strength of the matrix materials and their wear resistance, other elements may also be added to the melts. It has been found that approximately 1 to 4% by weight of silicon, 0.2 to 1% by weight of Mg and 0.1 to 1.5% by weight of Co may be added to an AlPb dispersion alloy to obtain a wear resistant functional layer. In order to improve the corrosion resistance of the lead minority phase, it is advisable to further add 0.5 to 3% by weight of tin. To copper-based alloys, such a CuPb22, usually 0.5 to 2% by weight of Sn and 0.2 to 1% by weight of Fe are added.

In order to improve the bonding strength between the sliding layer and the intermediate layer, a bonding layer or a diffusion barrier e.g. of Ni, Zn, Fe, Co (particularly with copper-based alloys) and also NiSn, CuZn, CuSn (particularly with aluminum-based alloys) is provided between the sliding layer and the intermediate layer.

In order to carry out the process, it is preferred to star out with a device provided with a crucible for melting and/or holding in readiness an alloy in the form of a metallic two-component or multi-component system with a miscibility gap, with casting means connected to the crucible and serving for casting a strip from the alloy, and further with means for receiving the cast strip and for its removal from the casting point, as well as with cooling means for the cast alloy strip leaving the casting point. According to the invention, the casting arrangement has to be built for the formation of a film-shaped or foil-shaped thin strip, either independently of or cast onto a substrate and the cooling means have to be provided with a forced-cooled receiving surface for the cast foil or forced-cooled support surface for the substrate to receive the cast material and also with highly effective cooling units directed onto the free surface of the cast foil or cast film.

In particularly advantageous embodiments, the device is equipped with strongly forced-cooled rollers, particularly a strongly forced-cooled roller for taking up the cast foil or carrier for the substrate receiving the casting In another embodiment of a device according to the invention a flat, optionally cooled, guide or transport path may be provided. Transversely to this guide or transport path, a casting flow device for the melted alloy is arranged, located at an adjustable distance above the guide path or a substrate positioned on the guide path. Such casting flow devices facilitate in a particularly advantageous manner the casting onto a substrate of a sliding layer built up in several stages. For this purpose, several spaced-apart casting flow devices are arranged in the direction of travel and between these casting flow devices and behind the last one of these devices cooling units are arranged, which act on the free surface of the cast film or on the free surface of the cast foil.

BRIEF DESCRIPTION OF THE DRAWING

The above and other objects, features and advantages will become more readily apparent from the following description, reference being made to the accompanying drawing in which.

SPECIFIC DESCRIPTION

Figure 1:
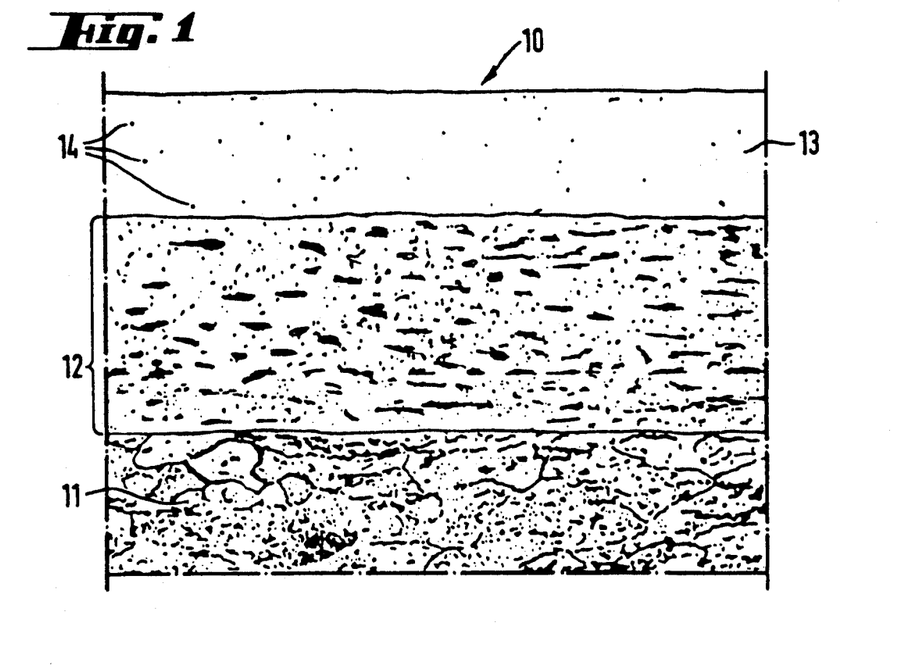
FIG. 1 is a considerably enlarged partial section of a laminated material comprising a cast-on sliding layer of a dispersion alloy.

FIG. 1 shows a very enlarged partial section of a laminated material 10 with a cast-on sliding layer 13 of a dispersion alloy AlPb8Si4SnCu and an intermediate layer 12 of AlZn5SiCuPbMg with a steel backing 11 The sliding layer (functional layer) 13 consists of a quasi-amorphous aluminum matrix containing finely distributed globular lead particles, of which only the largest lead particles 14 are visible in the illustration of FIG. 1, their size being of the order of $10^{-2}$ $\mu$m. A large number of lead particles are smaller and not visible in the enlargement scale selected for FIG. 1. Among others, the large number of lead particles is generated by the addition to the dispersion alloy of a nucleant adjusted to the alloy type, for instance P, B, Ti, or Si, boride, nitride or oxide, in a proportion by weight of approximately 2 %. In this way, a very large number of very fine lead particles was produced in the dispersion alloy, which during the casting and cooling of the sliding layer 13 have prevented each other from growing. Through quick cooling or chilling with a cooling rate of the order of $10^2$ to $10^6$ K/s, a large number of lead particles could be kept so small that their size remained below $10^{-2}$ $\mu$m. The segregation of the lead particles could be strongly reduced both in the case of large lead particles 14, as well as invisible small lead particles through very quick cooling or chilling of the sliding layer 13. The crystallization of the aluminum, which is typical for aluminum, was reduced in the aluminum matrix of the sliding layer 13 by the influence of crystallization inhibitor (glass formers) for which, for instance Si, B, P, Fe, Co or Ti can be used either individually or in mixtures in a proportion of 0.2 to 2% by weight and by a very quick cooling of the cast-on sliding layer 13.

In contrast to the sliding layer 13, the intermediate layer 12 shows a structure which is typical for cast-on aluminum alloys.

Figure 2:
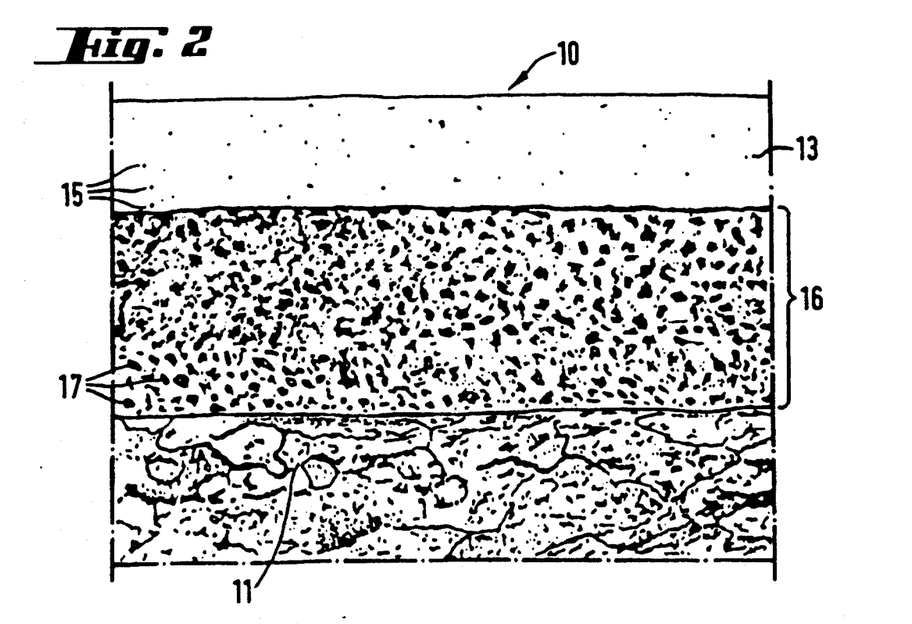
FIG. 2 is a considerably enlarged partial section of a laminated material according to another embodiment.

The example shown in FIG. 2 is a laminated material 10 with a support layer 11 made of steel and a sliding layer 13 as a functional layer consisting of an aluminum/lead dispersion alloy AlPb10Si7SnCu, i.e. with a lead content of 10% by weight and a content of silicon of 7% by weight which in this case acts both as a nucleant for the minority phase lead and also as a crystallization inhibitor in aluminum. As can be seen from FIG. 2, in the quasi-amorphous aluminum matrix of the functional layer 13 there are dispersed lead particles 14 in a fine globular distribution, while again only the larger lead particles with a size of about $10^{-2}$ $\mu$m are visible. The silicon is mostly dissolved in the quasi-amorphous aluminum matrix as a glass former and in a smaller part integrated into the minority phase lead as a nucleant Tin is integrated into the lead essentially for protection against corrosion.

The intermediate layer 16 consists in this example of a dispersion alloy CuPb22Sn and present a distribution of the lead particles 17 which is typical for this dispersion alloy.

Figure 3:
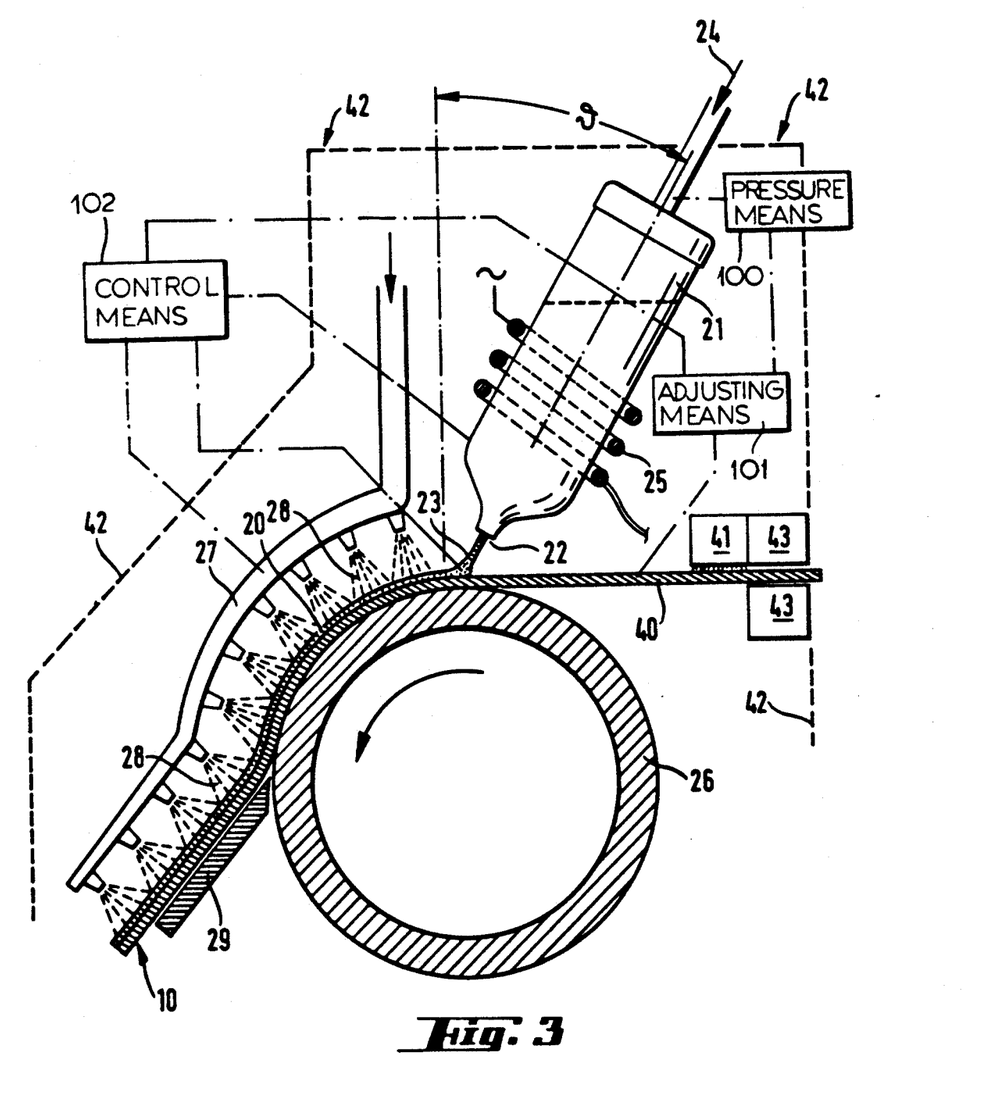
FIG. 3 is a diagrammatic representation of a first embodiment of a production device.
Figure 4:
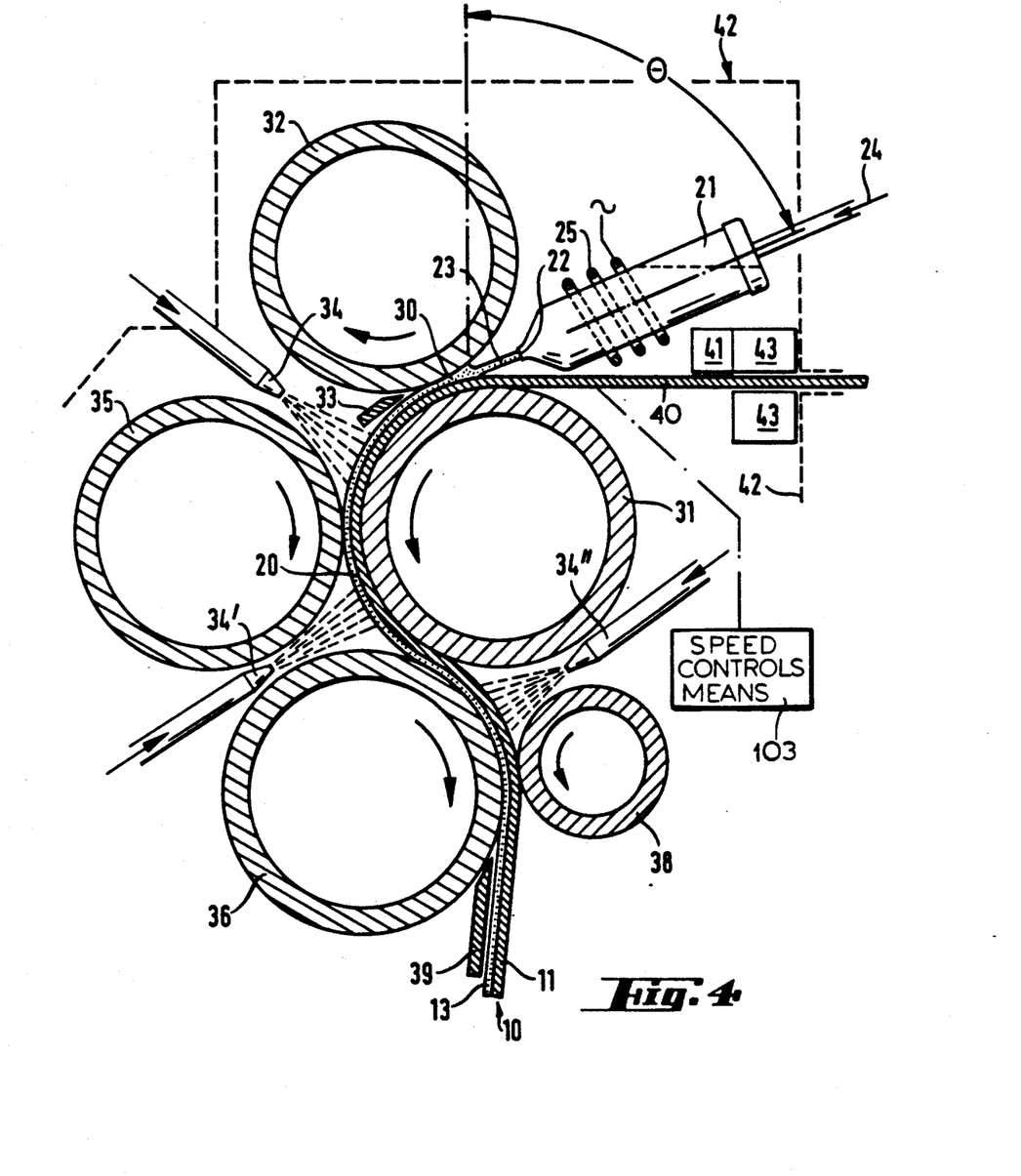
FIG. 4 is a diagrammatic representation of a production device modified with respect to FIG. 3.

One embodiment of a device for carrying out the method for the production of the-described laminated material having a sliding layer 13 made of alloys with a miscibility gap is shown in FIGS. 3 and 4 in two variants The alloy or dispersion alloy is melted and introduced in a crucible 21 having at its lower end an outlet 22 for a fine jet 23 of the melt. As indicated by arrow 24, from above gas under pressure is forced into the crucible 21, this gas being inert towards the melt and dissolving as little as possible in the melt. In the illustrated examples, the crucible 21 is surrounded by an induction coil 25, which keeps the melt at a preselected temperature and sufficiently liquid to be pressed through the outlet 22 and form a thin jet 23 For the processing of a dispersion alloy, the crucible can be additionally provided with agitator or vibrators which permanently and intensively mix the melt mixture of the dispersion alloy and keep the components of the mixture in a fine distribution. For the sake of simplicity, these mixers or vibrators were not shown in FIGS. 3 and 4.

The support layer 11 is unwound from a reel in the form of a metal strip and guided onto a strongly forced-cooled cylinder 26. Before the metal strip 40 reaches the cylinder 26, it passes through a device 41 for the cleaning and deoxidation of its surface, for instance a brushing device, to insure that the surface of metal strip 40 to be coated is free of oxides. For further preparation for the casting, the metal strip 40 passes through a tempering device 43 to insure the immediate bonding of the cast-on alloy with the surface of the metal strip 40. In order to maintain the established state up to the moment of casting, the metal strip 40 is guided up to the outlet of crucible 21 in an atmosphere of protective gas, as indicated by the protective hood 42. In the illustrated example, the casting itself, as well as subsequent cooling take place under this protective hood 42

The thin, strip-shaped or planar jet 23 of molten alloy or molten mixture of a dispersion alloy pressed downwards from the crucible 21 by pressure regulating means 100 meets in the embodiment shown in FIG. 3 the surface of the metal strip 40 at an acute angle δ. The angle δ is selected so that the jet 23 is immediately distributed over the surface of metal strip 40 in the form of a thin film without splashing. The cooling is provided primarily by the cylinder 26. But in order to intensively cool also the exposed coated surface of the laminated material 10, in the embodiment of FIG. 3 jets 28 of cool gas or cool liquid are provided which are directed onto the layer 20. The laminated material 10 is separated from cylinder 26 by strip remover 29.

The cooling rate of layer 20 on the cooled cylinder 26 under the opposite action of cooling jets 28 ranges from above $10^2$ K/s up to about $10^6$ K/s. Correspondingly a true alloy which forms the film 20 is kept in quasi-amorphous state, particularly when crystallization inhibitors (glass formers), have been added to the alloy. If a dispersion alloy with a miscibility gap of its components is processed, a film results in which the component of the dispersion alloy forming the matrix is in a quasi-amorphous state, while the component dispersed in the matrix (minority phase) is globular and finely distributed in the matrix.

In a modus operandi according to FIG. 4 the melt mixture of a dispersion alloy is put into a crucible 21 where it is set under pressure by a gaseous medium as shown by arrow 24. From the outlet 22 at the lower end of crucible 21 flows the melt or melt mixture in a jet 23 into a gap 30 between the metal strip guided over roller 31 and an opposite roller 32. Both rollers 31 and 32 are strongly forced-cooled. The width of gap 30 between the rollers is adjusted according to the desired thickness of the layer 20 to be produced. As indicated in FIG. 4, a slight accumulation of melt or melt mixture is formed upstream of gap 30 without causing any delay worth mentioning at the point of transfer of the melt or melt mixture from outlet 22 of crucible 21 into the gap 30. Therefore, the two rollers 31 and 32 do not exert any pressure worth mentioning onto the laminated material being produced, but have only a certain smoothing effect on the surface of the created layer 20. Further, this small accumulation of material at the gap results in a distribution of the melt or melt mixture in the axial direction of rollers 31 and 32, so that even strips can be produced, whose width is greater than the one which can be produced according to the example of FIG. 3. In order to facilitate this axial distribution of the melt or the melt mixture along the gap 30, the crucible 21 is inclined at an angle θ so that the melt or melt mixture under pressure in crucible 21 may be injected directly into gap 30.

The surface of roller 32 is so made that practically no bonding with the melted alloy or one of the components of a dispersion alloy to be processed occurs. In order to fasten the film 20 formed in gap 30 on the surface of the metal strip 40, the upper roller 32 is provided with a strip remover 33. In order to cool the free surface of film 20 formed at the outlet of gap 30, a cooling nozzle 34 is provided which directs a jet of cold gaseous or liquid medium towards the outlet of gap 30.

The metal strip 40 is further cooled by the cooling roller 31 in order to produce additional cooling, respectively to avoid a reheating of the film 20 by the metal strip 40.

Opposite to the cooling roller 31, a third cooling roller 35 is located, which is strongly forced-cooled to further cool the film 20 at its surface chilled by roller 32 and the coolant jet sprayed by nozzle 34. Downstream of the third cooling roller, a fourth cooling roller 36 is provided which takes u from roller 31 the metal strip with the film 20. In order to force an effective application of the film 20 onto the surface of the fourth cooling roller 36, a deflection roller 38, which is also cooled, is provided oppositely to the fourth cooling roller 36. The strip of laminated material 10 is removed from the fourth cooling roller 36 by a strip remover 39. As can be seen from FIG. 4, a second cooling nozzle 34' is arranged between the cooling rollers 35 and 36 and a third cooling nozzle 34" is arranged between the rollers 31 and 38. In comparison to the method according to FIG. 3, a further intensification of the cooling process takes place in the embodiment according to FIG. 4, so that the film 20 which becomes the sliding layer 13 is subjected to cooling rates ranging between $10^3$ K/s to $10^6$ K/s. Thereby the possibility arises to produce layers 20 of greater thickness, for instance 0.5 mm, which may be so intensively chilled over their entire thickness that the amorphous state of the metallic material is frozen during cooling. The method according to FIG. 4 finally makes possible the production of wider strips, particularly when several crucibles 21 are arranged next to each other along ga 30.

If a strip of laminated material 10 with an intermediate layer 12 or 16 is to be produced, a metal strip 40 in the form of a laminate is fed to the device according to FIG. 3 or FIG. 4, which has already been provided with the metal of the intermediate layer on the side to be coated.

Figure 5:
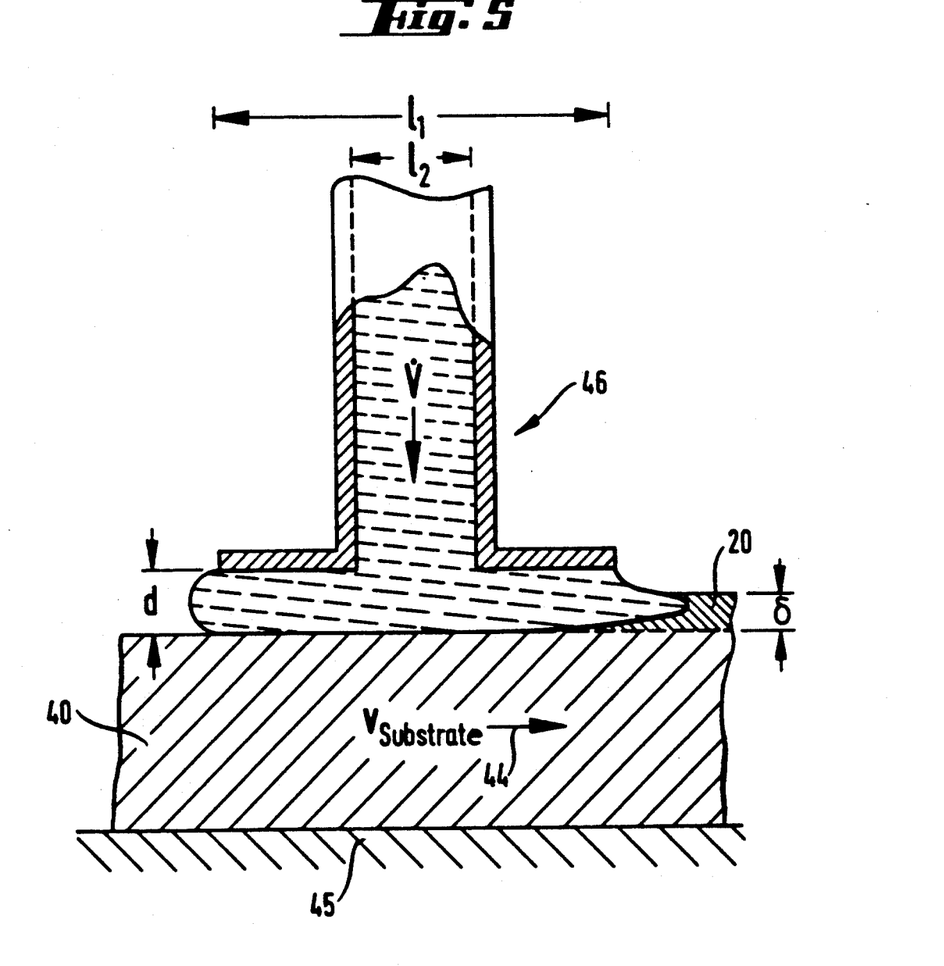
FIG. 5 is a diagrammatic representation of yet another embodiment of the device according to the invention.
Figure 6:
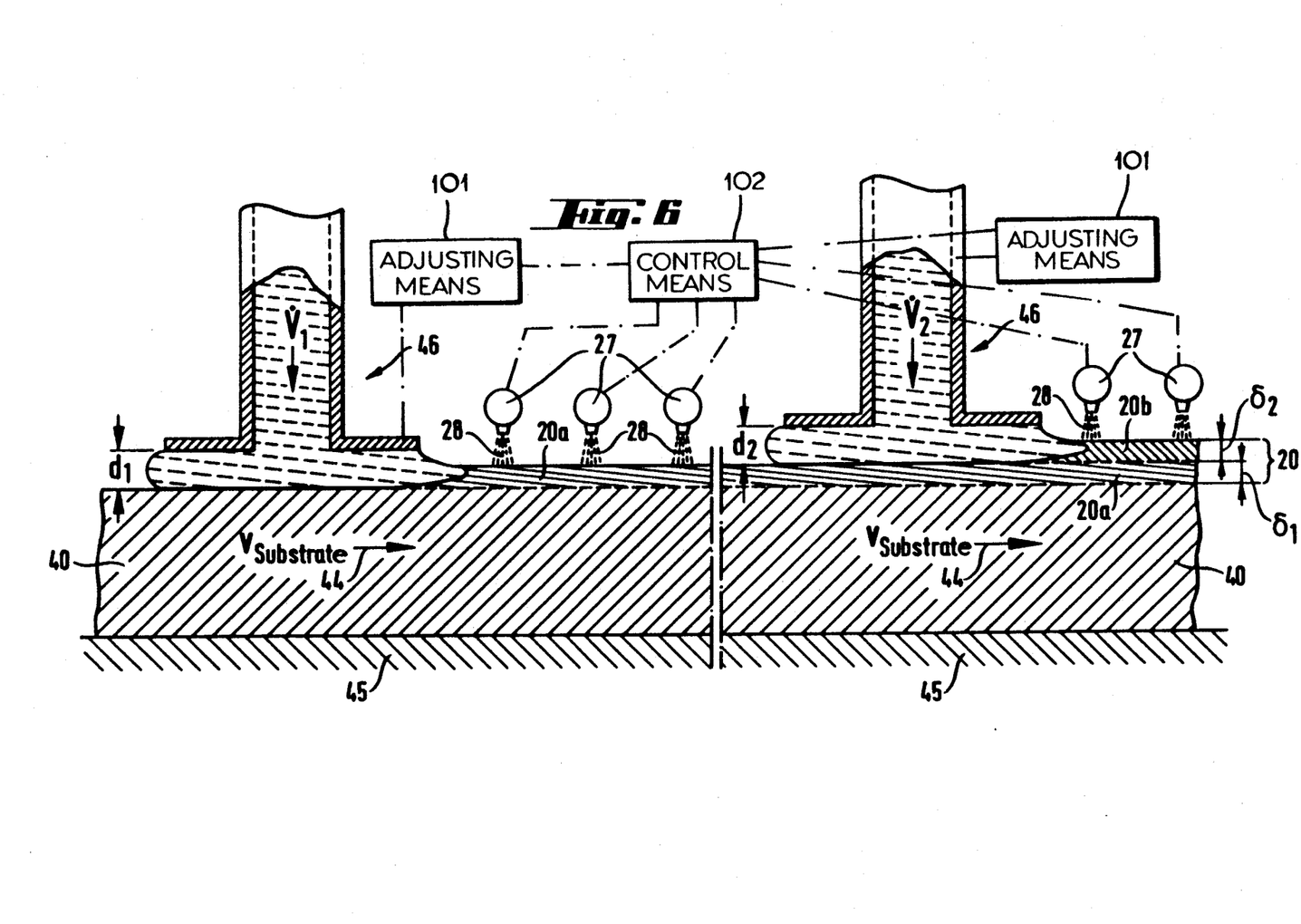
FIG. 6 is a diagrammatic representation of an embodiment of the devices according to the invention.

In the examples illustrated in FIGS. 5 and 6, the metal strip 40 representing the cast-on substrate, moves continuously at a speed v in the direction of travel 44 indicated by an arrow, on a guide and transport path 45, which can be forced-cooled. A casting flow device 46 belonging to a casting device is locate at a distance above the guide and transport path 45. The distance of the casting flow device 46 from the guide and transport path 45 is adjusted so that between the lower surface of the casting flow device 46, which extends substantially parallel to the guide and transport path 45, and the upper surface of metal strip 40, which is located on the guide and transport path 45, it corresponds to a preselected distance d which is such that the alloy melt is basically prevented from flowing out due to its surface tension in the gap formed as can be seen in the left-hand part of FIG. 5. On the side where the metal strip 40 moves away from the casting flow device 46, a film 20 is formed by adhesion of the alloy melt to the surface of the metal strip 40. The thickness δ of the film 20 is smaller than the distance d of the lower surface of the casting flow device 46 from the surface of the metal strip 40, but can be reproduced and calculated on the basis of the distance d, the travel speed v of metal strip 40, the pressure exerted on the melt and the flow volume rate V of the melt influenced thereby, and also by the dimensions $l_1$ and $l^2$ of the casting flow device 46.

The film formed on the metal strip 40 when leaving the casting flow device 46 is very quickly cooled on the one hand by the cooled metal strip 40 and on the other hand by a cooling unit possibly directed onto the free surface of the film 20, for instance gas jets or liquid jets, with a cooling rate of for instance $10^2$ to $10^4$ K/s.

As shown in FIG. 6, a casting device provided with a casting flow device 46 is particularly suitable for a multi-stage buildup of the sliding layer of two or more films (here 20a and 20b) cast successively onto the substrate. The two-stage or multi-stage buildup of the sliding layer has the advantage that the very thin alloy film 20 can be correspondingly quickly cooled, so that cooling rates of the order of $10^3$ to $10^5$ K/s can be easily achieved. Between the successive casting flow devices and after the last one of these casting flow devices 46, cooling units can be provided, which are directed onto the free surface of the respective just freshly formed alloy film 20, these cooling units consisting of for instance nozzle arrangements 27 producing coolant jets 28. In the examples shown in FIGS. 5 and 6, the casting flow device 46 extends across the guide and transport path 45, generally at right angles to the direction of travel 44. However, it is also conceivable to incline the casting flow device inclined at an angle above the guide and transport path 45.

In the example of FIG. 6 it is provided that the films 20, formed for the coating of the substrate or metal strip 40 are made of the same alloy and have the same thickness $\delta_1$ and $\delta_2$. Of course, a certain difference can be expected in the structure of the partial layers of the sliding layer formed by the films 20a, 20b, because the lower partial layer is at least partially reheated during the casting of the second film 20b.

Generally, the device in its embodiment according to FIGS. 5 and 6 offers particularly advantageous control possibilities. For instance, the defined thickness of the liquid film can be adjusted by adjusting the advancement speed by adjusting means 101 shown in FIGS. 1 and 6 of the solid metallic substrate. Also the cooling rate of the cast-on layer may be adjusted by any convention control means 102 receiving substrate speed, the distance between the outlet of the crucible and the substrate and injection speed of the alloy data from the adjusting means 101 receiving in turn pertinent data from speed control means 103 and pressure regulating means 100. The adjustment of the defined thickness of the liquid film can also be achieved by changing the geometry of the outlet for the alloy, namely by changing the distance d between the lower side of the casting flow device 46 and the surface of metal strip 40 and also by changing the dimensions of the casting flow device 46. By adjusting the distance d between the lower side of the casting flow device 46 and the surface of metal strip 40 it is also possible to influence and adjust the cooling rate of the cast-on layer, by control means 102 connected with nozzles respectively the cast-on film 20.

Figure 7:
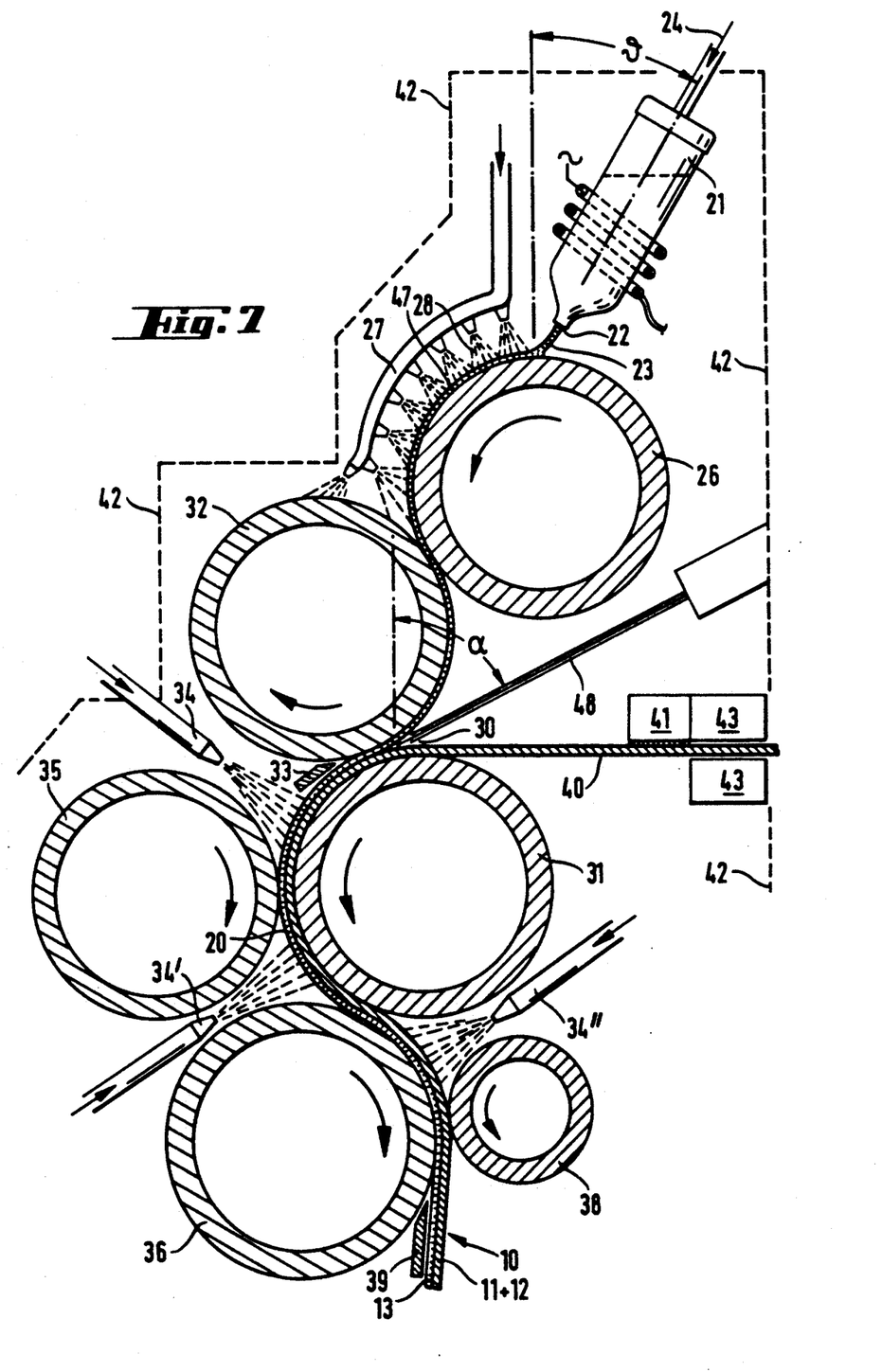
FIG. 7 is a diagrammatic representation of a further embodiment of the device, according to the invention.

In FIG. 7 an embodiment is illustrated wherein first a foil 47 forming the sliding layer is produced independently of the substrate or metal strip 40 and after cooling and solidification is joined by means of laser beams with the metal strip 40. In this device the alloy or dispersion alloy are introduced in molten state in the crucible 21 which at its lower end has an outlet 22 for the melt jet 23. The melt jet 23 arrives directly on the surface of a strongly forced-cooled cylinder 26 and forms there a foil 47 which is rapidly cooled by the cylinder 26 and passed underneath a nozzle arrangement 27 from which jets 28 of cold gas or cold liquid are directed onto the free surface of foil 47. The thickness of the foil 47 can be determined by the rotational speed of the cylinder 26 and by the expelling pressure built up inside the crucible 21 by an inert gas, as indicated by arrow 24. The casting of the dispersion alloy or alloy onto the surface of the cylinder 26 takes place at an angle $\delta$ which is selected so that no parts of the melt splash when coming in contact with the surface of cylinder 26. The surface of cylinder 26 is built so that bond is formed between the cast-on alloy and the cylinder surface, but only intensive heat transfer occurs.

Figure 8:
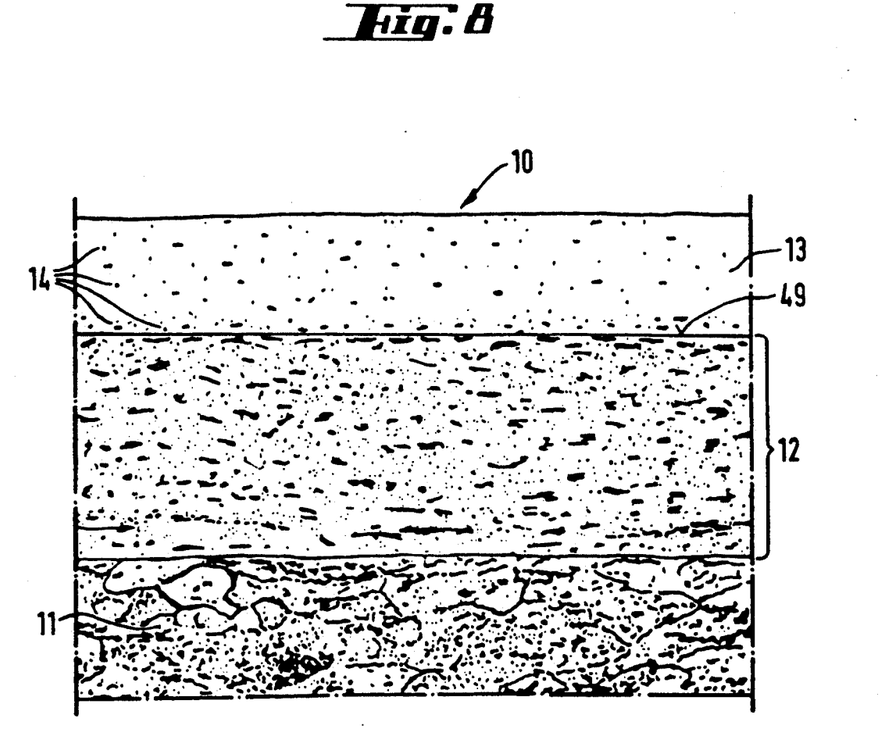
FIG. 8 is a considerably enlarged partial section of a laminated material produced in a device according to FIG. 7 with a soldered-on sliding layer of a dispersion alloy.

The cooling rate of foil 47 on the forced-cooled cylinder 26 and the opposite action of the cooling jets 28 lies between approximately $10^6$ and approximately $10^8$ K/s up to approximately $10^9$ K/s Consequently, a true alloy forming the foil 47 is basically kept in an amorphous state. If a dispersion alloy whose components have a miscibility gap is processed in this manner to form a foil 47, a matrix in a basically amorphous state is produced in this foil 47, while the component dispersed in this matrix is globular and exceptionally finely distributed. The foil produced in this manner is transferred to a strongly forced-cooled roller 32. The foil 47 is separated from the roller 32 by a strip remover 33. Opposite to the roller 32 a strongly forced-cooled roller 31 is located so that a gap 30 is formed, into which the foil 47 and a strip-like substrate, e.g. a metal strip 40, wound around roller 31 are directed. A bundle of laser beams 48 is directed into this gap at an angle $\alpha$ in such a way that the joining surfaces of foil 47 and of metal strip 40 are slightly heated. By pressing them lightly together, without any significant reduction of their thickness, the foil 47 and the metal strip 40 are soldered together along the heated surfaces. The strips joined this way are further cooled between the roller 31 and oppositely arranged cooling roller 35 and are transferred to a fourth cooling roller 36. Opposite to this fourth cooling roller 36, a deflection roller 38 which is also cooled is arranged. The strip 10 of laminated material is then taken up from the fourth cooling roller 36 by a strip remover 39. In contrast to the method according to FIGS. 3 and 4 and also to the method of FIGS. 5 and 6, a certain warming of the surfaces to be soldered together is necessary. As a consequence, some structural changes must be expected in the soldered surface areas as can be seen from FIG. 8. FIG. 8 shows a structure of the laminated material 10 which corresponds substantially to that shown in FIG. 1, the laminated material being composed of a backing material 10 made of steel, an intermediate layer 12 of AlZn5SiCuPbMg and a sliding layer 13 of a dispersion alloy AlPb8Si4SnCu. In contrast to the laminated material according to FIG. 1, the laminated material in FIG. 8 shows some coarsening in the structure of the intermediate layer 12 on the junction surface 49 facing the sliding layer 13. In the sliding layer 13, in the area of the soldered-on junction surface 49 facing the intermediate layer 12, somewhat larger lead particles 14 were formed as a result of the heating required for soldering. This structure coarsening and the formation of somewhat larger lead particles 14 are quite acceptable in view of the fact that by producing the sliding layer 13 as a foil a much quicker cooling of the foil forming the sliding layer 13 becomes possible, so that in the sliding layer 13 the aluminum matrix itself presents much stronger amorphous properties than in the example of FIG. 1, a difference which is however not visible at the enlargement scale selected for FIG. 8.

We claim:

1. A process for making a laminated material for a slide element, said process comprising the steps of:
   (a) forming a substrate including at least one backing layer;
   (b) continuously transporting the substrate along a path of the substrate;
   (c) making at least one alloy including at least two metallurgical components with a monotectic misability gap of immiscible particles;
   (d) continuously casting a functional layer at a predetermined rate from the alloy on the backing layer, at least at one location along the path, thereby forming the laminated material; and
   (e) thereafter solidifying the functional layer at a high cooling and solidification rate while continuing to advance the material along the path to prevent the growth of immiscible particles in the functional layer above 1 μm and to form said particles in a dimension range between 0.01 and 1 μm.

2. The process defined in claim 1 wherein the particles are less than 1 μm in size.

3. The process defined in claim 1 wherein the step (c) includes the steps of:
   fusing the components, and
   maintaining a temperature of the alloy above a segregation temperature corresponding to its composition.

4. The process defined in claim 3 wherein the step of maintaining the temperature further including a step of controlling the temperature of the substrate with respect to the cooling parameters corresponding to adhesion of the functional layer to the substrate.

5. The process defined in claim 1 wherein a nucleating agent selected from the group of P, B, Ti and Si boride, nitride and oxide is added to said alloy.

6. The process defined in claim 1 wherein in step (c) the components are added sequentially.

7. The process defined in claim 1 wherein in step (c) the components are added simultaneously in a proportion between 0.1 to 3.5% of weight.

8. The process defined in claim 1 wherein in step (e) further includes controlling the cooling rate in response to a casting rate.

9. The process defined in claim 1 wherein in step (d) further includes controlling a casting rate by varying a dosage of the alloy, thereby selecting a desired thickness of the functional layer at the application location.

10. The process defined in claim 1 wherein in step (d) further includes controlling a speed at which the substrate is transported from the application location, thereby selecting a desired thickness of the functional layer at the application location.

11. The process defined in claim 8 wherein in step (e) further includes controlling the cooling rate in response to a speed at which said substrate is transported.

12. The process defined in claim 1 wherein the alloy is AlPb, FePb, CuPb, MnPb or NiPb, including a respective content of the lead higher than a respective eutectic composition determined by the alloy, the content of the lead being up to 4% by mass in each of the alloys.

13. The process defined in claim 8 wherein in step (d) further includes a step of joining the substrate and the functional layer by a laser beam, the functional layer being a strip upon applying on the substrate.

14. The process defined in claim 8 wherein in step (c) further includes the steps of:
   accumulating the alloy in a crucible, the crucible being formed with an outlet, and
   changing a geometry of the outlet of the crucible, thereby controlling the extrusion rate and obtaining the desired thickness of the functional layer.

15. The process defined in claim 13 wherein the step (d) further includes a step of varying a distance between the substrate and the outlet of the crucible, thereby obtaining the desired thickness of the functional layer.

16. The process defined in claim 1 wherein said step (d) is performed at two application locations along the path of the substrate, said substrate being a metallic strip delivered to the locations and receiving a respective functional layer applied as a liquid film from a respective alloy at each of the application locations.

17. The process defined in claim 10 further including the steps of:
   (a) controlling the extrusion rate at each of the location, the extrusion rate at one of the locations being different from the extrusion rate at another location, and
   (b) adjusting the cooling rate at each of the locations in response to a respective casting rate, thereby forming the laminated material including a plurality of separate functional layers joined together and having respective different thickness.

18. The process defined in claim 16 further including a step of modifying a composition of the respective alloy at each of the locations.

19. The process defined in claim 16 wherein said substrate and said functional layer are cooled along the path of the material between the application locations.

20. The process defined in claim 1 further comprising the step of pressing the functional layer against the substrate upon cooling of the functional layer at a pressing location downstream of the application location.

21. The process defined in claim 1 further comprising a step of applying an intermediate layer on the substrate upstream from the application location, the intermediate layer being composed of another alloy selected from the group consisting of:
   a copper-lead alloy including from 9 to 25% of Pb, up to 11%, of Sn, and Fe, Ni, at most 0.7% of Mn and the balance copper;
   a copper-aluminum alloy including from 5 to 8% of Al and the balance copper;
   an aluminum-tin alloy containing from 0.5 to 1.5% of Cu, from 5 to 23% of Sn, from 0.5 to 1.5% of Ni, and the balance Al;
   an aluminum-nickel alloy including from 1 to 5% of Ni, from 0.5 to 2% of Mn, at most 1% of Cu an the balance aluminum; and
   aluminum-zinc alloy including from 4 to 6% of zn, from 0.5 to 3% of Si, at most 2% of Cu, at most 1% of Mg and the balanced Al.

22. An apparatus for carrying out a process for manufacturing of a laminated material for slide elements, said apparatus comprising:
   delivering means for continuously transporting a substrate including at least one backing layer along a path of the substrate;
   at least one crucible along the path for making an alloy including at least two metallurgical components having a plurality of immiscible particles;
   casting means operatively connected with the crucible for casting from the alloy a strip of a functional layer on the substrate at a casting rate at at least one application location, said strip and said substrate forming a laminated material;

applying means downstream from the crucible for removing the strip of functional layer applied on one side of the laminated material from the application location;

separating means downstream from the applying means for removing the strip of functional layer from the applying means; and cooling means along said path for cooling the laminated material at a cooling rate, said cooling means including:

at least one guide formed with a receiving forced-cooled surface taking up said laminated material at said application location and juxtaposed with another side of the laminated material opposite the one side, sprinkling means spacedly juxtaposed with the laminated material for sprinkling a coolant thereon, and a plurality of cooling rollers along said path downstream from the guide, the functional layer being solidified at a cooling rate with the immiscible particles in the being in a dimension range between 0.01 and 1 $\mu$m.

23. The apparatus defined in claim 22 further comprising control means for adjusting the cooling rate in response to the casting rate.

24. The apparatus defined in claim 22 further comprising adjusting means for controlling the casting rate of said strip from the crucible.

25. The apparatus defined in claim 24 wherein the crucible is formed an outlet spaced at a distance from the substrate, said adjusting means adjusting a distance between the outlet and the substrate, so that a thickness of said strip is adjustable.

26. The apparatus defined in claim 23 wherein said casting means includes pressure varying means for varying a speed at which said strip is ejected from the crucible.

27. The apparatus defined in claim 24 wherein said adjusting means includes speed control means for controlling a speed at which said substrate is advanced along path.

28. The apparatus defined in claim 23 wherein said guide is another roller.

29. The apparatus defined in claim 28 wherein said other roller rotates at a controlably varying speed.

30. The apparatus defined in claim 22 wherein said sprinkling means includes a plurality of nozzles, at least one of said nozzles being directed at said functional layer of said laminated material at said application location.

31. The apparatus defined in claim 30 wherein said plurality of nozzles being adapted to cool said one and opposite sides of the laminated material along said path.

32. The apparatus defined in claim 23 wherein said plurality of cooling rollers being adapted to contact said one and opposite sides of the laminated material along said path.

33. The apparatus defined in claim 23 wherein said application means includes a drum, said drum being juxtaposed with said functional layer and defining said application location with said guide juxtaposed with the opposite side of the substrate.

34. The apparatus defined in claim 22 further comprising two crucibles for making alloys, each of said crucibles extracting a respective strip of the functional layer at a respective application location at a respective controllable casting rate.

* * * * *